United States Patent
Matsui

(10) Patent No.: US 11,866,586 B2
(45) Date of Patent: *Jan. 9, 2024

(54) RUBBER COMPOSITION FOR TIRES AND TIRE

(71) Applicant: Sumitomo Rubber Industries, Ltd., Hyogo (JP)

(72) Inventor: Ryoji Matsui, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/597,716

(22) PCT Filed: Jul. 6, 2020

(86) PCT No.: PCT/JP2020/026346
§ 371 (c)(1),
(2) Date: Jan. 19, 2022

(87) PCT Pub. No.: WO2021/024666
PCT Pub. Date: Feb. 11, 2021

(65) Prior Publication Data
US 2022/0243042 A1    Aug. 4, 2022

(30) Foreign Application Priority Data
Aug. 5, 2019   (JP) .................. 2019-143856

(51) Int. Cl.
C08L 9/06 (2006.01)

(52) U.S. Cl.
CPC .......... C08L 9/06 (2013.01); *C08L 2205/025* (2013.01); *C08L 2205/03* (2013.01)

(58) Field of Classification Search
CPC .. C08L 9/06; C08L 2205/025; C08L 2205/03; C08L 9/00; C08L 91/00; C08L 15/00; C08K 3/04; C08K 3/36; C08K 5/09; C08K 5/548; C08F 236/06; C08F 212/08
See application file for complete search history.

(56) References Cited

U.S. PATENT DOCUMENTS

| | | | |
|---|---|---|---|
| 4,257,468 A * | 3/1981 | Ogawa | B60C 1/0016 524/495 |
| 4,616,065 A | 10/1986 | Hargis et al. | |
| 4,669,518 A | 6/1987 | Hargis et al. | |
| 4,670,502 A | 6/1987 | Hargis et al. | |
| 5,385,969 A | 1/1995 | Saito et al. | |
| 2008/0027166 A1 | 1/2008 | Hochi et al. | |
| 2008/0161519 A1 | 7/2008 | Halasa et al. | |
| 2011/0230593 A1 | 9/2011 | Kondo | |
| 2013/0331498 A1 | 12/2013 | Miyazaki | |
| 2016/0340477 A1 | 11/2016 | Takahashi | |
| 2019/0071560 A1 | 3/2019 | Sekine et al. | |
| 2019/0185646 A1 | 6/2019 | Recker et al. | |
| 2020/0247982 A1 | 8/2020 | Sano et al. | |
| 2020/0392314 A1 * | 12/2020 | De Gaudemaris | C08L 21/00 |

FOREIGN PATENT DOCUMENTS

| | | |
|---|---|---|
| CN | 102199316 A | 9/2011 |
| CN | 102634087 A | 8/2012 |
| CN | 103483636 A | 1/2014 |
| CN | 110028711 A | 7/2019 |
| EP | 0818478 A1 | 1/1998 |
| EP | 2366557 A1 | 9/2011 |
| EP | 3210796 A1 | 8/2017 |
| EP | 3 323 630 * | 5/2018 |
| EP | 3511179 A1 | 7/2019 |
| EP | 3 567 076 A1 | 11/2019 |
| EP | 3778750 A1 | 2/2021 |
| JP | S57-87443 A | 5/1982 |
| JP | S61-238845 A | 10/1986 |
| JP | S63-99248 A | 4/1988 |
| JP | S63-99250 A | 4/1988 |
| JP | S63-99252 A | 4/1988 |
| JP | H01-174543 A | 7/1989 |
| JP | H02-18431 A | 1/1990 |
| JP | H03-220003 A | 9/1991 |
| JP | 2000-007832 A | 1/2000 |
| JP | 2006-307039 A | 11/2006 |

(Continued)

OTHER PUBLICATIONS

International Search Report issued in PCT/JP2020/026346; dated Sep. 29, 2020.
International Search Report issued in PCT/JP2020/026350; dated Sep. 24, 2020.
International Preliminary Report on Patentability (Chapter II) issued in PCT/JP2020/026350; completed Jan. 20, 2021.

*Primary Examiner* — Doris L Lee
(74) *Attorney, Agent, or Firm* — Studebaker & Brackett PC

(57) ABSTRACT

The present disclosure aims to provide a tire rubber composition and a tire which have good wet grip performance and an excellent ability to reduce deterioration of wet grip performance and abrasion resistance over time. The present disclosure relates to a tire rubber composition which contains one or more rubber components having a combined content of styrene-butadiene rubber and polybutadiene of 90% by mass or more, one or more fillers, and one or more vulcanizing agents, the rubber composition as a whole having a vinyl content of 20 mol % or higher and a trans content of 50 mol % or higher, each based on 100 mol % of the combined amount of the butadiene-based structural units in the butadiene portion of the styrene-butadiene rubber and the polybutadiene.

7 Claims, No Drawings

(56) References Cited

FOREIGN PATENT DOCUMENTS

| | | | |
|---|---|---|---|
| JP | 2007-302715 A | 11/2007 |
| JP | 2007-302813 A | 11/2007 |
| JP | 2008-050570 A | 3/2008 |
| JP | 2008-163337 A | 7/2008 |
| JP | 2009-084413 A | 4/2009 |
| JP | 2011-012131 A | 1/2011 |
| JP | 2011-079997 A | 4/2011 |
| JP | 2017-203080 A | 11/2017 |
| JP | 2018-044175 A | 3/2018 |
| JP | 2018-150419 A | 9/2018 |
| WO | 2018/128141 A1 | 7/2018 |
| WO | 2019/082728 A1 | 5/2019 |
| WO | WO 2019/115954 | * | 6/2019 |

* cited by examiner

RUBBER COMPOSITION FOR TIRES AND TIRE

TECHNICAL FIELD

The present disclosure relates to a tire rubber composition and a tire.

BACKGROUND ART

It is desirable for tires to have improved wet grip performance (braking performance on wet roads) for safety.

For example, Patent Literature 1 discloses a rubber composition containing a predetermined amount of two specific types of silica to improve wet grip performance.

CITATION LIST

Patent Literature

Patent Literature 1: JP 2008-50570 A

SUMMARY OF DISCLOSURE

Technical Problem

As a result of extensive research and experimentation, the present inventor has found that conventional techniques leave room for improvement in reducing deterioration of wet grip performance and abrasion resistance over time.

The present disclosure aims to solve the new problem found by the inventor and provide a tire rubber composition and a tire which have good wet grip performance and an excellent ability to reduce deterioration of wet grip performance and abrasion resistance over time.

Solution to Problem

The present disclosure relates to a tire rubber composition, containing: one or more rubber components having a combined content of styrene-butadiene rubber and polybutadiene of 90% by mass or more; one or more fillers; and one or more vulcanizing agents, the rubber composition as a whole having a vinyl content of 20 mol % or higher and a trans content of 50 mol % or higher, each based on 100 mol % of a combined amount of butadiene-based structural units in a butadiene portion of the styrene-butadiene rubber and the polybutadiene.

Preferably, the vinyl content is 30 mol % or higher, more preferably 35 mol % or higher, still more preferably 36 mol % or higher.

Preferably, the rubber composition contains 80 parts by mass or more of silica per 100 parts by mass of the rubber components.

Preferably, the rubber composition contains the styrene-butadiene rubber and the polybutadiene.

Preferably, the rubber composition contains syndiotactic 1,2-polybutadiene.

The present disclosure also relates to a tire, including a tread including the rubber composition.

Advantageous Effects of Disclosure

The present disclosure provides a tire rubber composition containing one or more rubber components having a combined content of styrene-butadiene rubber and polybutadiene of 90% by mass or more, one or more fillers, and one or more vulcanizing agents, the rubber composition as a whole having a vinyl content of 20 mol % or higher and a trans content of 50 mol % or higher, each based on 100 mol % of the combined amount of the butadiene-based structural units in the butadiene portion of the styrene-butadiene rubber and the polybutadiene. Such a tire rubber composition has good wet grip performance and an excellent ability to reduce deterioration of wet grip performance and abrasion resistance over time.

DESCRIPTION OF EMBODIMENTS

The tire rubber composition of the present disclosure contains one or more rubber components having a combined content of styrene-butadiene rubber and polybutadiene of 90% by mass or more, one or more fillers, and one or more vulcanizing agents. Further, the rubber composition as a whole has a vinyl content of 20 mol % or higher and a trans content of 50 mol % or higher, each based on 100 mol % of the combined amount of the butadiene-based structural units in the butadiene portion of the styrene-butadiene rubber and the polybutadiene. Thus, it is possible to have good wet grip performance and to improve the ability to reduce deterioration of wet grip performance over time and the ability to reduce deterioration of abrasion resistance over time.

The tire rubber composition provides the above-mentioned effect. The reason for this advantageous effect is not exactly clear but may be explained as follows.

The tire rubber composition contains one or more rubber components based on styrene-butadiene rubber (SBR) and/or polybutadiene (BR). The rubber composition as a whole has a vinyl content (hereinafter, also referred to as vinyl content of the rubber composition) of 20 mol % or higher and a trans content (hereinafter, also referred to as trans content of the rubber composition) of 50 mol % or higher, each based on 100 mol % of the combined amount of the butadiene-based structural units in the butadiene portion of the styrene-butadiene rubber and the polybutadiene.

Here, as such butadiene-based structural units, there are cis-1,4-units, trans-1,4-units, and vinyl-1,2-units. The cis-1,4-units and trans-1,4-units have a double bond in the backbone, whereas the vinyl-1,2-units have no double bond in the backbone.

Moreover, the vinyl content of the rubber composition refers to the amount of vinyl-1,2-units based on 100 mol % of the combined amount of the butadiene-based structural units derived from the styrene-butadiene rubber and polybutadiene. The trans content of the rubber composition refers to the amount of trans-1,4-units based on 100 mol % of the combined amount of the butadiene-based structural units derived from the styrene-butadiene rubber and polybutadiene. The below-mentioned cis content of the rubber composition refers to the amount of cis-1,4-units based on 100 mol % of the combined amount of the butadiene-based structural units derived from the styrene-butadiene rubber and polybutadiene.

When the vinyl content of the rubber composition is 20 mol % or higher, the amount of double bonds in the polymer backbone is reduced so that the molecular chains of the polymer are less likely to be broken by ozone attack, thereby making it possible to reduce deterioration of wet grip performance and abrasion resistance over time. Thus, good wet grip performance can also be obtained.

When the trans content of the rubber composition is 50 mol % or higher, highly polar functional groups can be more exposed to the tire surface, thereby improving the hydrophilicity of the entire tire. Thus, better wet grip performance can be obtained.

Furthermore, when the vinyl content of the rubber composition is 20 mol % or higher and at the same time the trans content of the rubber composition is 50 mol % or higher, wet grip performance is synergistically improved and good wet grip performance can be maintained for a long time.

As described above, the tire rubber composition contains one or more rubber components based on styrene-butadiene rubber and polybutadiene and has a vinyl content of 20 mol % or higher and a trans content of 50 mol % or higher to have good wet grip performance and to improve the ability to reduce deterioration of wet grip performance over time and the ability to reduce deterioration of abrasion resistance over time.

The tire rubber composition as a whole has a vinyl content (vinyl content of the rubber composition) of 20 mol % or higher, preferably 20.1 mol % or higher, more preferably 20.2 mol % or higher, still more preferably 20.9 mol % or higher, particularly preferably 22.9 mol % or higher, most preferably 23 mol % or higher, further preferably 26.8 mol % or higher, further preferably 28.1 mol % or higher, further preferably 29.4 mol % or higher, further preferably 30 mol % or higher, further preferably 30.4 mol % or higher, further preferably 30.7 mol % or higher, further preferably 31.3 mol % or higher, further preferably 31.4 mol % or higher, further preferably 35 mol % or higher, further preferably 36 mol % or higher, further preferably 36.3 mol % or higher, but preferably 85 mol % or lower, more preferably 80 mol % or lower, still more preferably 60 mol % or lower, particularly preferably 55 mol % or lower, most preferably 50 mol % or lower, still most preferably 45 mol % or lower, further most preferably 40.1 mol % or lower, based on 100 mol % of the combined amount of the butadiene-based structural units in the butadiene portion of the styrene-butadiene rubber and the polybutadiene. When the vinyl content is within the range indicated above, the advantageous effect can be more suitably achieved.

The tire rubber composition as a whole has a trans content (trans content of the rubber composition) of 50 mol % or higher, preferably 50.1 mol % or higher, more preferably 50.2 mol % or higher, still more preferably 50.6 mol % or higher, particularly preferably 51 mol % or higher, most preferably 51.1 mol % or higher, further most preferably 51.3 mol % or higher, but preferably 80 mol % or lower, more preferably 75 mol % or lower, still more preferably 70 mol % or lower, particularly preferably 68.3 mol % or lower, most preferably 65 mol % or lower, further preferably 61.1 mol % or lower, further preferably 60 mol % or lower, further preferably 58.1 mol % or lower, further preferably 57.9 mol % or lower, further preferably 55.7 mol % or lower, further preferably 54.6 mol % or lower, further preferably 53.5 mol % or lower, based on 100 mol % of the combined amount of the butadiene-based structural units in the butadiene portion of the styrene-butadiene rubber and the polybutadiene. When the trans content is within the range indicated above, the advantageous effect can be more suitably achieved.

The tire rubber composition as a whole preferably has a cis content (cis content of the rubber composition) of 5 mol % or higher, more preferably 9.3 mol % or higher, still more preferably 10 mol % or higher, particularly preferably 11.6 mol % or higher, most preferably 13 mol % or higher, further preferably 13.5 mol % or higher, further preferably 13.9 mol % or higher, further preferably 14.1 mol % or higher, further preferably 15.3 mol % or higher, further preferably 16.2 mol % or higher, but preferably 60 mol % or lower, more preferably 50 mol % or lower, still more preferably 40 mol % or lower, particularly preferably 30 mol % or lower, most preferably 25.2 mol % or lower, further preferably 20 mol % or lower, further preferably 19.6 mol % or lower, further preferably 18.9 mol % or lower, further preferably 18.7 mol % or lower, further preferably 18.5 mol % or lower, further preferably 18 mol % or lower, further preferably 17.1 mol % or lower, based on 100 mol % of the combined amount of the butadiene-based structural units in the butadiene portion of the styrene-butadiene rubber and the polybutadiene. When the cis content is within the range indicated above, the advantageous effect can be more suitably achieved.

The vinyl content of the rubber composition, the trans content of the rubber composition, and the cis content of the rubber composition indicated above may be achieved by using an appropriate combination of SBR and/or BR.

For example, rubber components such as SBR with a high trans content, BR with a high trans content, and BR with a high vinyl content may be combined.

Chemicals that may be used in the rubber composition are described below.

The tire rubber composition contains styrene-butadiene rubber (SBR) and/or polybutadiene (BR). To more suitably achieve the advantageous effect, the tire rubber composition preferably contains SBR and BR.

Any SBR may be used. Examples include those commonly used in the tire industry, such as emulsion-polymerized SBR (E-SBR) and solution-polymerized SBR (S-SBR). These may be used alone or in combinations of two or more. Preferred among these are combinations of two or more types of SBR having different vinyl contents and/or different trans contents.

The styrene content of the SBR is preferably 10% by mass or higher, more preferably 15% by mass or higher, still more preferably 20% by mass or higher, but is preferably 50% by mass or lower, more preferably 40% by mass or lower, still more preferably 30% by mass or lower, particularly preferably 25% by mass or lower. When the styrene content is within the range indicated above, the advantageous effect tends to be more suitably achieved.

The vinyl content of the SBR is preferably 10 mol % or higher, more preferably 15 mol % or higher, still more preferably 20 mol % or higher, but is preferably 80 mol % or lower, more preferably 70 mol % or lower, still more preferably 50 mol % or lower, particularly preferably 40 mol % or lower. When the vinyl content is within the range indicated above, the advantageous effect tends to be more suitably achieved.

The trans content of the SBR is preferably 10 mol % or higher, more preferably 15 mol % or higher, still more preferably 20 mol % or higher, particularly preferably 40 mol % or higher, most preferably 60 mol % or higher, but is preferably 90 mol % or lower, more preferably 85 mol % or lower, still more preferably 80 mol % or lower. When the trans content is within the range indicated above, the advantageous effect tends to be more suitably achieved.

By using SBR with a trans content within the range indicated above (high trans content), highly polar functional groups can be more exposed to the tire surface, thereby improving the hydrophilicity of the entire tire. Thus, better wet grip performance can be obtained.

The cis content of the SBR is preferably 3 mol % or higher, more preferably 5 mol % or higher, still more preferably 10 mol % or higher, but is preferably 40 mol % or lower, more preferably 30 mol % or lower. When the cis content is within the range indicated above, the advantageous effect tends to be more suitably achieved.

Herein, the vinyl content, trans content, and cis content of the SBR each refer to the content based on 100 mol % of the butadiene-based structural units in the SBR.

The SBR may be either unmodified or modified SBR.

The modified SBR may be any SBR having a functional group interactive with a filler such as silica. Examples include: chain end-modified SBR obtained by modifying at least one chain end of SBR with a compound (modifier) having the functional group (i.e., chain end-modified SBR terminated with the functional group); backbone-modified SBR having the functional group in the backbone; backbone- and chain end-modified SBR having the functional group in both the backbone and chain end (e.g., backbone- and chain end-modified SBR in which the backbone has the functional group and at least one chain end is modified with the modifier); and chain end-modified SBR into which a hydroxy or epoxy group has been introduced by modification (coupling) with a polyfunctional compound having two or more epoxy groups in the molecule. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may have substituent groups. Preferred among these are amino groups (preferably amino groups whose hydrogen atom is replaced with a C1-C6 alkyl group), alkoxy groups (preferably C1-C6 alkoxy groups), alkoxysilyl groups (preferably C1-C6 alkoxysilyl groups), and amide groups.

SBR products manufactured or sold by Sumitomo Chemical Co., Ltd., JSR Corporation, Asahi Kasei Corporation, Zeon Corporation, etc. may be used as the SBR.

The SBR is preferably SBR 1 having a styrene content of 30% by mass or higher and a trans content of 55 mol % or lower or SBR 2 having a styrene content of 25% by mass or lower and a trans content of 60 mol % or higher, more preferably a combination of SBR 1 and SBR 2.

The styrene content of the SBR 1 is preferably 35% by mass or higher but is preferably 50% by mass or lower, more preferably 45% by mass or lower. Moreover, the trans content of the SBR 1 is preferably 10 mol % or higher, more preferably 15 mol % or higher, still more preferably 20 mol % or higher, particularly preferably 40 mol % or higher.

The styrene content of the SBR 2 is preferably 10% by mass or higher, more preferably 15% by mass or higher, still more preferably 20% by mass or higher. Moreover, the trans content of the SBR 2 is preferably 90 mol % or lower, more preferably 85 mol % or lower, still more preferably 80 mol % or lower.

The vinyl content and cis content of the SBR 1 and SBR 2 are as described for the vinyl content and cis content of the SBR described above.

The amount of SBR based on 100% by mass of the rubber components is preferably 10% by mass or more, preferably 20% by mass or more, more preferably 40% by mass or more, still more preferably 60% by mass or more, particularly preferably 70% by mass or more, and may be 100% by mass, but is preferably 90% by mass or less, more preferably 85% by mass or less. When the amount is within the range indicated above, the advantageous effect tends to be better achieved.

The amount of SBR 1 based on 100% by mass of the rubber components is preferably 10% by mass or more, more preferably 25% by mass or more, but is preferably 60% by mass or less, more preferably 50% by mass or less. When the amount is within the range indicated above, the advantageous effect tends to be better achieved.

The amount of SBR 2 based on 100% by mass of the rubber components is preferably 10% by mass or more, more preferably 35% by mass or more, but is preferably 70% by mass or less, more preferably 55% by mass or less. When the amount is within the range indicated above, the advantageous effect tends to be better achieved.

Any polybutadiene (BR) may be used, and examples include those commonly used in the tire industry, such as high-cis BR having a high cis content, low-cis BR having a low cis content, BR containing syndiotactic polybutadiene crystals, and BR synthesized using rare earth catalysts (rare earth-catalyzed BR). Crystalline BR such as syndiotactic 1,2-polybutadiene may also be used. These may be used alone or in combinations of two or more.

Moreover, the BR may be either unmodified or modified BR. Examples of the modified BR include those into which the above-mentioned functional groups are introduced. Preferred embodiments of the modified BR are as described for the modified SBR.

The BR may be commercially available from Ube Industries, Ltd., JSR Corporation, Asahi Kasei Corporation, Zeon Corporation, etc.

In particular, the BR is preferably BR 1 having a trans content of 45 mol % or higher or syndiotactic 1,2-polybutadiene (BR 2), more preferably syndiotactic 1,2-polybutadiene (BR 2). The BR is also preferably a combination of BR 1 having a trans content of 45 mol % or higher and syndiotactic 1,2-polybutadiene (BR 2).

Particularly by incorporating syndiotactic 1,2-polybutadiene, the amount of double bonds in the polymer backbone is reduced so that the molecular chains of the polymer are less likely to be broken by ozone attack, thereby making it possible to more suitably reduce deterioration of wet grip performance and abrasion resistance over time. BR containing syndiotactic polybutadiene crystals (for example, VCR available from Ube Industries, Ltd.) is also conventionally used and has a cis-1,4-linked backbone, whereas the syndiotactic 1,2-polybutadiene (BR 2) has a vinyl-1,2-linked backbone, thereby making it possible to more suitably reduce deterioration of wet grip performance and abrasion resistance over time.

The trans content of the BR 1 is preferably 45 mol % or higher, more preferably 50 mol % or higher. The trans content is also preferably 70 mol % or lower, more preferably 60 mol % or lower, still more preferably 55 mol % or lower. When the trans content is within the range indicated above, the advantageous effect tends to be better achieved.

The vinyl content of the BR 1 is preferably 20 mol % or lower, more preferably 15 mol % or lower. The vinyl content is also preferably 5 mol % or higher, more preferably 10 mol % or higher. When the vinyl content is within the range indicated above, the advantageous effect tends to be better achieved.

The cis content of the BR 1 is preferably 20 mol % or higher, more preferably 30 mol % or higher. The cis content is also preferably 50 mol % or lower, more preferably 40 mol % or lower. When the cis content is within the range indicated above, the advantageous effect tends to be better achieved.

The vinyl content of the syndiotactic 1,2-polybutadiene (SPB, BR 2) is preferably 80 mol % or higher, more preferably 85 mol % or higher, still more preferably 90 mol % or higher, particularly preferably 93 mol % or higher, and may be 100 mol %. When the vinyl content is within the range indicated above, the advantageous effect tends to be better achieved.

The trans content and cis content of the BR 2 are each preferably 6 mol % or lower, more preferably 3 mol % or lower, and may be 0 mol %. When the trans and cis contents are each within the range indicated above, the advantageous effect tends to be better achieved.

The melting point of the BR 2 is not limited, but it is preferably 80° C. or higher, more preferably 100° C. or higher, still more preferably 105° C. or higher, but is preferably 180° C. or lower, more preferably 150° C. or lower, still more preferably 130° C. or lower. When the melting point is within the range indicated above, the advantageous effect tends to be better achieved.

Herein, the melting point of the BR refers to the melting peak temperature in the DSC curve measured in accordance with JIS K7121.

The degree of crystallization of the BR 2 is not limited, but it is preferably 15% or higher, more preferably 25% or higher, but is preferably 50% or lower, more preferably 40% or lower. When the degree of crystallization is within the range indicated above, the advantageous effect tends to be better achieved.

Herein, the degree of crystallization is calculated from the density measured by the water displacement method in which the density of 1,2-polybutadiene with a degree of crystallization of 0% is 0.889 g/cm$^3$ and the density of 1,2-polybutadiene with a degree of crystallization of 100% is 0.963 g/cm$^3$.

The amount of BR based on 100% by mass of the rubber components is preferably 5% by mass or more, more preferably 10% by mass or more, still more preferably 15% by mass or more, but is preferably 40% by mass or less, more preferably 30% by mass or less. When the amount is within the range indicated above, the advantageous effect tends to be better achieved.

The amount of BR 1 based on 100% by mass of the rubber components is preferably 5% by mass or more, more preferably 8% by mass or more, but is preferably 20% by mass or less, more preferably 15% by mass or less. When the amount is within the range indicated above, the advantageous effect tends to be better achieved.

The amount of BR 2 (SPB) based on 100% by mass of the rubber components is preferably 5% by mass or more, more preferably 8% by mass or more, but is preferably 20% by mass or less, more preferably 15% by mass or less. When the amount is within the range indicated above, the advantageous effect tends to be better achieved.

The combined amount of SBR and BR based on 100% by mass of the rubber components is 90% by mass or more, preferably 95% by mass or more, more preferably 98% by mass or more, and may be 100% by mass. When the combined amount is within the range indicated above, the advantageous effect tends to be better achieved.

Examples of usable rubber components other than SBR and BR include diene rubber such as isoprene-based rubber, styrene-isoprene-butadiene rubber (SIBR), acrylonitrile-butadiene rubber (NBR), chloroprene rubber (CR), and butyl rubber (IIR). The rubber components may be used alone or in combinations of two or more. Diene rubber is preferred among these, with isoprene-based rubber being more preferred.

The term "rubber component" preferably refers to rubber having a weight average molecular weight (Mw) of 150,000 or more, more preferably 350,000 or more. The upper limit of the Mw is not limited, but it is preferably 4,000,000 or less, more preferably 3,000,000 or less.

Examples of the isoprene-based rubber include natural rubber (NR), polyisoprene rubber (IR), refined NR, modified NR, and modified IR. The NR may be ones commonly used in the tire industry, such as SIR20, RSS #3, or TSR20. Any IR may be used, and examples include those commonly used in the tire industry, such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone or in combinations of two or more. NR is preferred among these.

Herein, the weight average molecular weight (Mw) and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The cis content, vinyl content, and trans content can be measured by $^{13}$C-NMR analysis. Moreover, the styrene content can be measured by $^1$H-NMR analysis.

The vinyl content of the rubber composition, the trans content of the rubber composition, and the cis content of the rubber composition may be measured directly on the rubber composition by $^{13}$C-NMR analysis, or may be calculated from the vinyl content, trans content, and cis content, respectively, measured on the material rubber and in proportion to the amount of the material rubber.

The rubber composition contains one or more fillers (reinforcing fillers).

Any filler may be used, and examples include silica, carbon black, calcium carbonate, talc, alumina, clay, aluminum hydroxide, and mica. These may be used alone or in combinations of two or more. Preferred among these are silica and carbon black, with silica being more preferred. A combination of silica and carbon black is also preferred.

The amount of fillers per 100 parts by mass of the rubber components is preferably 20 parts by mass or more, more preferably 40 parts by mass or more, still more preferably 60 parts by mass or more, but is preferably 200 parts by mass or less, more preferably 180 parts by mass or less, still more preferably 160 parts by mass or less, particularly preferably 130 parts by mass or less, most preferably 110 parts by mass or less. When the amount is within the range indicated above, the advantageous effect tends to be better achieved.

Any carbon black may be used, and examples include N134, N110, N220, N234, N219, N339, N330, N326, N351, N550, and N762. These may be used alone or in combinations of two or more.

The nitrogen adsorption specific surface area ($N_2SA$) of the carbon black is preferably 80 m$^2$/g or more, more preferably 100 m$^2$/g or more, but is preferably 200 m$^2$/g or less, more preferably 150 m$^2$/g or less, still more preferably 125 m$^2$/g or less. When the $N_2SA$ is within the range indicated above, the advantageous effect tends to be better achieved.

Herein, the $N_2SA$ of the carbon black is measured in accordance with JIS K6217-2:2001.

The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of carbon black per 100 parts by mass of the rubber components is preferably 3 parts by mass or more, but is preferably 80 parts by mass or less, more preferably 50 parts by mass or less, still more preferably 30 parts by mass or less, particularly preferably 20 parts by mass or less, most preferably 10 parts by mass or less. When the amount is within the range indicated above, the advantageous effect tends to be better achieved.

Examples of the silica include dry silica (anhydrous silicic acid) and wet silica (hydrous silicic acid). Wet silica is preferred because it has a large number of silanol groups. These may be used alone or in combinations of two or more.

The nitrogen adsorption specific surface area ($N_2SA$) of the silica is 40 $m^2/g$ or more, preferably 70 $m^2/g$ or more, more preferably 80 $m^2/g$ or more, still more preferably 140 $m^2/g$ or more, particularly preferably 160 $m^2/g$ or more. The $N_2SA$ is also preferably 600 $m^2/g$ or less, more preferably 300 $m^2/g$ or less, still more preferably 250 $m^2/g$ or less, particularly preferably 200 $m^2/g$ or less. When the $N_2SA$ is within the range indicated above, the advantageous effect tends to be more suitably achieved.

The $N_2SA$ of the silica is measured by the BET method in accordance with ASTM D3037-81.

The silica may be commercially available from Degussa, Rhodia, Tosoh Silica Corporation, Solvay Japan, Tokuyama Corporation, etc.

The amount of silica per 100 parts by mass of the rubber components is preferably 5 parts by mass or more, more preferably 10 parts by mass or more, still more preferably 20 parts by mass or more, particularly preferably 40 parts by mass or more, most preferably 60 parts by mass or more, further preferably 80 parts by mass or more, further preferably 100 parts by mass or more, but is preferably 200 parts by mass or less, more preferably 180 parts by mass or less, still more preferably 160 parts by mass or less, particularly preferably 140 parts by mass or less. When the amount is within the range indicated above, the advantageous effect tends to be better achieved.

The amount of silica based on 100% by mass of the fillers (reinforcing fillers) in the rubber composition is preferably 30% by mass or more, more preferably 50% by mass or more, still more preferably 70% by mass or more, particularly preferably 85% by mass or more, most preferably 90% by mass or more, and may be 100% by mass. When the amount is within the range indicated above, the advantageous effect tends to be more suitably achieved.

The rubber composition containing silica preferably further contains one or more silane coupling agents.

Any silane coupling agent may be used. Examples include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Degussa, Momentive, Shin-Etsu Silicone, Tokyo Chemical Industry Co., Ltd., AZmax. Co., DuPont Toray Specialty Materials K.K., etc. may be used. These may be used alone or in combinations of two or more. Sulfide silane coupling agents are preferred among these, with disulfide silane coupling agents having a disulfide bond, such as bis(3-triethoxysilylpropyl)disulfide, being more preferred, because the advantageous effect tends to be better achieved.

The amount of silane coupling agents per 100 parts by mass of the silica is preferably 3 parts by mass or more, more preferably 6 parts by mass or more, but is preferably 20 parts by mass or less, more preferably 15 parts by mass or less, still more preferably 10 parts by mass or less. When the amount is within the range indicated above, the advantageous effect tends to be better achieved.

The rubber composition preferably contains sulfur as a crosslinking agent (vulcanizing agent).

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

Examples of vulcanizing agents other than sulfur include organic peroxides.

The sulfur may be commercially available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of vulcanizing agents (preferably sulfur) per 100 parts by mass of the rubber components is preferably 0.1 parts by mass or more, more preferably 0.2 parts by mass or more, still more preferably 0.3 parts by mass or more, particularly preferably 0.5 parts by mass or more, but is preferably 5 parts by mass or less, more preferably 3 parts by mass or less, still more preferably 2 parts by mass or less, particularly preferably 1.5 parts by mass or less. When the amount is within the range indicated above, the advantageous effect tends to be better achieved.

The rubber composition preferably contains one or more vulcanization accelerators.

Examples of the vulcanization accelerators include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide and/or guanidine vulcanization accelerators, with combinations of sulfenamide and guanidine vulcanization accelerators being more preferred.

The vulcanization accelerators may be commercially available from Kawaguchi Chemical Industry Co., Ltd., Ouchi Shinko Chemical Industrial Co., Ltd., Rhein Chemie, etc.

The amount of vulcanization accelerators per 100 parts by mass of the rubber components is preferably 0.5 parts by mass or more, more preferably 1 part by mass or more, still more preferably 2 parts by mass or more, but is preferably 10 parts by mass or less, more preferably 5 parts by mass or less. When the amount is within the range indicated above, the advantageous effect tends to be better achieved.

The rubber composition may contain one or more resins.

Any resin may be used, and examples include solid alkylphenol resins, styrene resins, coumarone-indene resins, terpene resins, rosin resins, acrylic resins, and dicyclopentadiene resins (DCPD resins). These may be used alone or in combinations of two or more.

The resins may be commercially available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., etc.

The amount of resins per 100 parts by mass of the rubber components is preferably 1 part by mass or more, more preferably 3 parts by mass or more, still more preferably 5 parts by mass or more. The amount is also preferably 80 parts by mass or less, more preferably 50 parts by mass or less, still more preferably 20 parts by mass or less.

The rubber composition may contain one or more softeners.

Any softener may be used, and examples include oils and liquid diene polymers. These may be used alone or in combinations of two or more.

Examples of the oils include process oils, vegetable oils, and mixtures thereof. Examples of the process oils include paraffinic process oils, aromatic process oils, and naphthenic process oils. Examples of the vegetable oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. To achieve the advantageous effect well, process oils are preferred among these, with aromatic process oils being more preferred.

The oils may be commercially available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

Liquid diene polymers refer to diene polymers that are liquid at room temperature (25° C.)

The weight average molecular weight (Mw) of the liquid diene polymers is preferably $3.0 \times 10^3$ or more, more preferably $4.0 \times 10^3$ or more, but is preferably $1.0 \times 10^5$ or less, more preferably $1.5 \times 10^4$ or less. When the Mw is within the range indicated above, the advantageous effect can be more suitably achieved.

Examples of the liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR). These may be used alone or in combinations of two or more. To more suitably achieve the advantageous effect, liquid SBR is preferred among these.

The liquid diene polymers may be commercially available from Sartomer, Kuraray Co., Ltd., etc.

The amount of softeners (preferably oils) per 100 parts by mass of the rubber components is preferably 5 parts by mass or more, more preferably 8 parts by mass or more, but is preferably 40 parts by mass or less, more preferably 30 parts by mass or less, still more preferably 20 parts by mass or less. When the amount is within the range indicated above, the advantageous effect tends to be better achieved. Herein, the amount of softeners includes the amount of oils contained in the rubber (oil extended rubber), if used.

The rubber composition may contain one or more waxes.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Petroleum waxes are preferred among these, with paraffin waxes being more preferred.

The waxes may be commercially available from Ouchi Shinko Chemical Industrial Co., Ltd., Nippon Seiro Co., Ltd., Seiko Chemical Co., Ltd., etc.

The amount of waxes per 100 parts by mass of the rubber components is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber composition may contain one or more antioxidants.

Examples of the antioxidants include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Preferred among these are p-phenylenediamine and/or quinoline antioxidants, with combinations of p-phenylenediamine and quinoline antioxidants being more preferred.

The antioxidants may be commercially available from Seiko Chemical Co., Ltd., Sumitomo Chemical Co., Ltd., Ouchi Shinko Chemical Industrial Co., Ltd., Flexsys, etc.

The amount of antioxidants per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain stearic acid.

Conventional stearic acid may be used, such as those available from NOF Corporation, Kao Corporation, FUJIFILM Wako Pure Chemical Corporation, Chiba Fatty Acid Co., Ltd., etc.

The amount of stearic acid per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain zinc oxide.

Conventional zinc oxide may be used, such as those available from Mitsui Mining & Smelting Co., Ltd., Toho Zinc Co., Ltd., Hakusui Tech Co., Ltd., Seido Chemical Industry Co., Ltd., Sakai Chemical Industry Co., Ltd., etc.

The amount of zinc oxide per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

In addition to the above-described components, the rubber composition may further contain additives commonly used in the tire industry. The amount of such additives is preferably 0.1 to 200 parts by mass per 100 parts by mass of the rubber components.

The rubber composition may be prepared, for example, by kneading the components in a rubber kneading machine such as an open roll mill or a Banbury mixer, and then vulcanizing the kneaded mixture.

The kneading conditions are as follows. In a base kneading step of kneading additives other than vulcanizing agents and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably from 80 to 110° C. Moreover, the composition obtained after kneading vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber composition may be used in tire components (i.e., as a tire rubber composition), including, for example, treads (cap treads), sidewalls, base treads, undertreads, clinches, bead apexes, breaker cushion rubbers, rubbers for carcass cord topping, insulations, chafers, and innerliners, and side reinforcement layers of run-flat tires. The rubber composition is especially suitable for use in treads.

The tire (e.g., pneumatic tire) of the present disclosure may be produced from the rubber composition by usual methods. Specifically, the unvulcanized rubber composition containing additives as needed may be extruded into the shape of a tire component (in particular, a tread (cap tread)) and then formed and assembled with other tire components in a usual manner in a tire building machine to build an unvulcanized tire, which may then be heated and pressurized in a vulcanizer to produce a tire.

Non-limiting examples of the tire include pneumatic tires, solid tires, and airless tires. Preferred among these are pneumatic tires.

The tire can be suitably used as any of the following tires: tires for passenger cars, tires for large passenger cars, tires for large SUVs, tires for trucks and buses, tires for two-wheeled vehicles, racing tires, winter tires (studless winter tires, snow tires, studded tires), all-season tires, run-flat tires, aircraft tires, mining tires, etc.

EXAMPLES

The present disclosure is specifically described with reference to, but not limited to, examples.

The chemicals used in the examples and comparative examples are listed below.

SBR 1: modified SBR produced in Production Example 1 described below (styrene content: 40% by mass, cis content: 21 mol %, trans content: 49 mol %, vinyl content: 30 mol %, Mw: 950,000)

SBR 2: E-SBR with both ends modified, polymerized in accordance with the method for producing polymer 7) described in JP 2018-76432 A (styrene content: 23.5% by mass, cis content: 12 mol %, trans content: 71 mol %, vinyl content: 17 mol %)

BR 1: modified BR produced in Production Example 2 described below (cis content: 36 mol %, trans content: 52 mol %, vinyl content: 12 mol %, Mw: 550,000)

BR 2: RB840 (syndiotactic 1,2-polybutadiene, melting point: 126° C., cis content: 3 mol %, trans content: 3 mol %, vinyl content: 94 mol %, degree of crystallization: 36%) available from JSR Corporation Carbon black: Seast I (N220, $N_2SA$: 114 $m^2/g$) available from Mitsubishi Chemical Corporation Silica: Ultrasil VN3 ($N_2SA$: 175 $m^2/g$) available from Evonik Degussa Stearic acid: stearic acid "TSUBAKI" available from NOF Corporation Wax: Ozoace 0355 available from Nippon Seiro Co., Ltd.

Oil: Diana process NH-70S (aromatic process oil) available from Idemitsu Kosan Co., Ltd.

Silane coupling agent: Si266 (bis(3-triethoxysilylpropyl) disulfide) available from Evonik Degussa Zinc oxide: zinc oxide #2 available from Mitsui Mining & Smelting Co., Ltd.

Antioxidant 1: NOCRAC 6C (N-(1,3-dimethylbutyl)-N'-phenyl-p-phenylenediamine) available from Ouchi Shinko Chemical Industrial Co., Ltd.

Antioxidant 2: NOCRAC RD (poly(2,2,4-trimethyl-1,2-dihydroquinoline)) available from Ouchi Shinko Chemical Industrial Co., Ltd.

5% oil-containing sulfur: powdered sulfur (5% oil-containing sulfur) available from Tsurumi Chemical Industry Co., Ltd.

Vulcanization accelerator CZ: Soxinol CZ (N-cyclohexyl-2-benzothiazolylsulfenamide) available from Sumitomo Chemical Co., Ltd.

Vulcanization accelerator DPG: Soxinol D (N,N'-diphenylguanidine) available from Sumitomo Chemical Co., Ltd.

Production Example 1

A nitrogen-purged autoclave reactor was charged with cyclohexane, tetrahydrofuran, styrene, and 1,3-butadiene. The temperature of the contents of the reactor was adjusted to 20° C., and then n-butyllithium was added to initiate polymerization. The polymerization was carried out under adiabatic conditions, and the maximum temperature reached 85° C. Once the polymerization conversion ratio reached 99%, 1,3-butadiene was further added, followed by polymerization for five minutes. Subsequently, N,N-bis(trimethylsilyl)-3-aminopropyltriethoxysilane was added as a modifier, and a reaction was performed. After completion of the polymerization reaction, 2,6-di-tert-butyl-p-cresol was added. Thereafter, the solvent was removed by steam stripping. The product was dried on hot rolls adjusted at 110° C. to obtain SBR 1.

Production Example 2

To a graduated flask in a nitrogen atmosphere were added 3-dimethylaminopropyltrimethoxysilane and then anhydrous hexane to prepare a terminal modifier.

A sufficiently nitrogen-purged pressure-proof vessel was charged with n-hexane, butadiene, and TMEDA, followed by heating to 60° C. Next, butyllithium was added, and the mixture was then heated to 50° C. and stirred for three hours. Subsequently, the terminal modifier was added, and the mixture was stirred for 30 minutes. To the reaction solution were added methanol and 2,6-tert-butyl-p-cresol, and the resulting reaction solution was put into a stainless steel vessel containing methanol. Then, aggregates were collected. The aggregates were dried under reduced pressure for 24 hours to obtain a modified polybutadiene rubber (BR 1).

Examples and Comparative Examples

The chemicals other than the sulfur and vulcanization accelerators according to the formulation shown in Table 1 were kneaded in a 1.7 L Banbury mixer (Kobe Steel, Ltd.) at 150° C. for four minutes to give a kneaded mixture. Then, the sulfur and vulcanization accelerators were added to the kneaded mixture, and they were kneaded in an open roll mill at 80° C. for four minutes to prepare an unvulcanized rubber composition. Then, the unvulcanized rubber composition was press-vulcanized in a 0.5 mm-thick die at 170° C. for 12 minutes to give a vulcanized rubber composition.

Moreover, an unvulcanized rubber composition prepared as above was formed into the shape of a tread and assembled with other tire components to build an unvulcanized tire. The unvulcanized tire was press-vulcanized at 170° C. for 10 minutes to prepare a test tire (size: 195/65R15).

The vulcanized rubber compositions and test tires prepared as above were left in an oven at 40° C. for 60 days to prepare aged vulcanized rubber compositions and test tires.

The vulcanized rubber compositions (new), vulcanized rubber compositions (after aging), test tires (new), and test tires (after aging) were subjected to the evaluations below. Table 1 shows the results.

<Wet Grip Performance>

The vulcanized rubber compositions were analyzed using a portable skid tester (Stanley) in accordance with ASTM E303-83. The results are expressed as an index (wet grip performance index) relative to the vulcanized rubber composition (new) of Example 1, which is taken as 105. A higher index indicates a shorter braking distance and thus better wet skid performance (wet grip performance). Here, a wet grip performance (before aging) index of 80 or higher is considered to represent good wet grip performance.

Moreover, a wet grip performance retention ratio was calculated from the evaluation results of the new and aged vulcanized rubber compositions. A higher wet grip performance retention ratio indicates a better ability to reduce deterioration of wet grip performance over time. Here, a wet grip performance retention ratio of 80 or higher is considered to represent a good ability to reduce deterioration of wet grip performance over time.

<Abrasion Resistance>

A set of test tires (new) or test tires (after aging) were mounted on a front-engine, front-wheel-drive car made in Japan. After running 8,000 km, the groove depth in the tire tread portion was measured. A distance that caused a 1 mm decrease in tire groove depth was calculated and expressed as an index (abrasion resistance index) relative to Example 13 which is taken as 100. A higher index indicates a longer distance that caused a 1 mm decrease in tire groove depth and thus better abrasion resistance.

Moreover, an abrasion resistance retention ratio was calculated from the evaluation results of the new and aged test tires. A higher abrasion resistance retention ratio indicates a better ability to reduce deterioration of abrasion resistance over time. Here, an abrasion resistance retention ratio of 80 or higher is considered to represent a good ability to reduce deterioration of abrasion resistance over time.

TABLE 1

| | | Comp. Ex. 1 | Comp. Ex. 2 | Comp. Ex. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|
| Amount (parts by mass) | SBR 1 | 0 | 80 | 0 | 20 | 30 | 40 | 50 | 50 | 45 | 24 | 0 |
| | SBR 2 | 60 | 0 | 0 | 60 | 50 | 40 | 30 | 40 | 55 | 75 | 96 |
| | BR 1 | 40 | 0 | 95 | 10 | 10 | 10 | 10 | 10 | 0 | 0 | 0 |
| | BR 2 | 0 | 20 | 5 | 10 | 10 | 10 | 10 | 0 | 0 | 1 | 4 |
| | Carbon black | 5 | 5 | 5 | 5 | 5 | 5 | 5 | 5 | 5 | 5 | 5 |
| | Silica | 75 | 75 | 75 | 75 | 75 | 75 | 75 | 75 | 75 | 75 | 75 |
| | Stearic acid | 2 | 2 | 2 | 2 | 2 | 2 | 2 | 2 | 2 | 2 | 2 |
| | Wax | 1.5 | 1.5 | 1.5 | 1.5 | 1.5 | 1.5 | 1.5 | 1.5 | 1.5 | 1.5 | 1.5 |
| | Oil | 10 | 10 | 10 | 10 | 10 | 10 | 10 | 10 | 10 | 10 | 10 |
| | Silane coupling agent | 6 | 6 | 6 | 6 | 6 | 6 | 6 | 6 | 6 | 6 | 6 |
| | Zinc oxide | 2 | 2 | 2 | 2 | 2 | 2 | 2 | 2 | 2 | 2 | 2 |
| | Antioxidant 1 | 2 | 2 | 2 | 2 | 2 | 2 | 2 | 2 | 2 | 2 | 2 |
| | Antioxidant 2 | 1 | 1 | 1 | 1 | 1 | 1 | 1 | 1 | 1 | 1 | 1 |
| | 5% Oil-containing sulfur | 1.4 | 1.4 | 1.4 | 1.4 | 1.4 | 1.4 | 1.4 | 1.4 | 1.4 | 1.4 | 1.4 |
| | Vulcanization accelerator CZ | 1.8 | 1.8 | 1.8 | 1.8 | 1.8 | 1.8 | 1.8 | 1.8 | 1.8 | 1.8 | 1.8 |
| | Vulcanization accelerator DPG | 2.2 | 2.2 | 2.2 | 2.2 | 2.2 | 2.2 | 2.2 | 2.2 | 2.2 | 2.2 | 2.2 |
| | Vinyl content | 15.0 | 42.8 | 16.1 | 26.8 | 28.1 | 29.4 | 30.7 | 23.0 | 22.9 | 20.9 | 20.1 |
| | Cis content | 21.6 | 17.4 | 34.4 | 15.3 | 16.2 | 17.1 | 18.0 | 18.9 | 16.1 | 14.1 | 11.6 |
| | Trans content | 63.4 | 39.8 | 49.6 | 57.9 | 55.7 | 53.5 | 51.3 | 58.1 | 61.1 | 65.0 | 68.3 |
| Evaluation result | Wet grip performance (before aging) | 74 | 135 | 63 | 105 | 114 | 123 | 132 | 129 | 116 | 102 | 85 |
| | Wet grip performance (after aging) | 60 | 108 | 51 | 90 | 100 | 110 | 120 | 106 | 97 | 90 | 77 |
| | Wet grip performance retention ratio (%) | 80.8 | 80.0 | 80.4 | 85.7 | 87.7 | 89.4 | 90.9 | 82.2 | 83.9 | 88.2 | 90.6 |
| | Abrasion resistance (before aging) | 150 | 50 | 190 | 95 | 94 | 93 | 91 | 115 | 100 | 110 | 130 |

TABLE 1-continued

|                                      |      |      |       |      |    |      |      |      |     |      |      |
|--------------------------------------|------|------|-------|------|----|------|------|------|-----|------|------|
| Abrasion resistance (after aging)    | 120  | 30   | 155   | 80   | 79 | 78   | 76   | 93   | 81  | 91   | 120  |
| Abrasion resistance retention ratio (%) | 80.0 | 60.0 | 81.6  | 84.2 | 84 | 83.9 | 83.5 | 80.9 | 81.0 | 82.7 | 92.3 |

Ex.: Example
Comp. Ex.: Comparative Example

As shown in Table 1, good wet grip performance and an excellent ability to reduce deterioration of wet grip performance and abrasion resistance over time were exhibited in the examples using a rubber composition which contained one or more rubber components having a combined content of styrene-butadiene rubber and polybutadiene of 90% by mass or more, one or more fillers, and one or more vulcanizing agents and which as a whole had a vinyl content of 20 mol % or higher and a trans content of 50 mol % or higher, each based on 100 mol % of the combined amount of the butadiene-based structural units in the butadiene portion of the styrene-butadiene rubber and the polybutadiene.

The invention claimed is:

1. A tire rubber composition, comprising:
   one or more rubber components having a combined content of styrene-butadiene rubber and polybutadiene of 90% by mass or more;
   one or more fillers; and
   one or more vulcanizing agents,
   the rubber composition as a whole having a vinyl content of 20 mol % or higher and a trans content of 50 mol % or higher, each based on 100 mol % of a combined amount of butadiene-based structural units in a butadiene portion of the styrene-butadiene rubber and the polybutadiene,
   wherein the rubber composition comprises the styrene-butadiene rubber and the polybutadiene, and
   at least a portion of the polybutadiene rubber has a trans content of 45 mol % or higher.

2. The tire rubber composition according to claim 1, wherein the vinyl content is 30 mol % or higher.

3. The tire rubber composition according to claim 1, wherein the vinyl content is 35 mol % or higher.

4. The tire rubber composition according to claim 1, wherein the vinyl content is 36 mol % or higher.

5. The tire rubber composition according to claim 1, wherein the rubber composition comprises 80 parts by mass or more of silica per 100 parts by mass of the rubber components.

6. The tire rubber composition according to claim 1, wherein the rubber composition comprises syndiotactic 1,2-polybutadiene.

7. A tire, comprising a tread comprising the rubber composition according to claim 1.

* * * * *